United States Patent
Jefferies et al.

(10) Patent No.: US 10,236,790 B2
(45) Date of Patent: Mar. 19, 2019

(54) POWER SUPPLY WITH DETECTION AND NOTIFICATION OF EXCEEDED DESIGN LIMITS

(71) Applicant: SCHNEIDER ELECTRIC USA, INC., Andover, MA (US)

(72) Inventors: Kevin M Jefferies, Raleigh, NC (US); Benjamin W Edwards, Rolesville, NC (US); Matthew L White, Cary, NC (US); Richard Karl Weiler, Wake Forest, NC (US)

(73) Assignee: Schneider Electric USA, Inc., Andover, MA (US)

( * ) Notice: Subject to any disclaimer, the term of this patent is extended or adjusted under 35 U.S.C. 154(b) by 0 days.

(21) Appl. No.: 15/378,389

(22) Filed: Dec. 14, 2016

(65) Prior Publication Data
US 2018/0166998 A1   Jun. 14, 2018

(51) Int. Cl.
| | |
|---|---|
| *H02H 3/04* | (2006.01) |
| *H02H 3/24* | (2006.01) |
| *H02H 7/125* | (2006.01) |
| *H02M 7/217* | (2006.01) |
| *H02M 1/32* | (2007.01) |

(52) U.S. Cl.
CPC ............ *H02M 7/217* (2013.01); *H02M 1/32* (2013.01)

(58) Field of Classification Search
CPC .. H02M 1/32; H02M 2001/325; H02M 7/217; H03K 17/081; H03K 17/0812; H03K 17/78; H02H 3/00; H02H 3/04; H02H 3/12; H02H 3/024; H02H 3/243; H02H 7/10; H02H 7/12; H02H 7/1125
See application file for complete search history.

(56) References Cited

U.S. PATENT DOCUMENTS

| | | | | |
|---|---|---|---|---|
| 4,757,417 A | * | 7/1988 | Futsuhara | ........ H03K 17/08144 361/78 |
| 5,146,386 A | * | 9/1992 | Learned | ................ H02H 3/023 361/100 |
| 5,457,591 A | * | 10/1995 | Mock | ...................... H02H 3/08 361/18 |
| 6,583,997 B1 | | 6/2003 | Reid et al. | |
| 6,683,443 B2 | * | 1/2004 | Neild | ..................... H02M 1/36 323/282 |
| 7,489,120 B2 | | 2/2009 | Matthews | |
| 7,719,810 B2 | | 5/2010 | Ueda | |
| 2002/0036581 A1 | * | 3/2002 | Haeusser-Boehm | ........................ H05B 39/044 341/157 |

* cited by examiner

*Primary Examiner* — Gary L Laxton
(74) *Attorney, Agent, or Firm* — Locke Lord LLP

(57) ABSTRACT

A system to detect application conditions exceeding SELV design limitations and to subsequently warn or take action. A pulse detector is coupled to the switching pole of an output FET of a SELV power supply through an optocoupler and tracks when the FET is commutated off to block conduction. If a pulse occurs more than once in a given period the power supply is declared to be outside of SELV design parameters and warnings are issued or actions are taken.

13 Claims, 2 Drawing Sheets

POWER SUPPLY WITH DETECTION AND NOTIFICATION OF EXCEEDED DESIGN LIMITS

BACKGROUND OF THE INVENTION

1. Field of the Invention

The present invention relates to the field of Extra Low Voltage power supplies and specifically to detection and further actions when exceeding Safety Extra Low Voltage parameters.

2. Discussion of Related Art

Some electronic products will include a safety extra low voltage (SELV) circuit. Common examples include embedded electronics which include a low voltage electrical interface with which a person may come into physical contact, such as an Ethernet or a USB port.

The safety of a SELV circuit is provided by using designed-in limitations of extra-low voltage, the low risk of accidental contact with a higher voltage; and the lack of a return path through earth (ground) that electric current could take in case of contact with a human body. The design of a SELV circuit typically involves, among other things, an isolating transformer, guaranteed minimum distances between conductors and electrical insulation barriers. The electrical connectors of SELV circuits can be designed such that they do not mate with connectors commonly used for non-SELV circuits.

The design of a product with SELV circuits will also entail certain constraints on the application of the product to maintain the SELV level of performance. Those application constraints will include the range of voltage that can be applied to circuits of the product. However, real world use may subject the product to extraordinary conditions such as overvoltages which violate the particular product's application for the SELV design limitations. Further, after the SELV design limitations are violated, the product may not provide SELV protection but the product may still operate rather than causing a functional failure which will be obvious to the user.

However, in the current art, if the product, or its SELV power supply, does not fail, no known provisions are made to provide a warning of loss of SELV protection or to mitigate system damage which might be caused by operating outside of the SELV design limitations.

SUMMARY OF THE INVENTION

Product failure is sometimes an acceptable outcome if it tells the user that the product has malfunctioned due to extraordinary conditions. One purpose of this invention is to detect these extraordinary conditions that exceed SELV design limitations without product failure and enable a response by the product or the system it is in, including suitable notice and/or coordinated actions, depending on the application of the product. Non-failure conditions exceeding the SELV safety constraints might be dealt with by: 1) shut down, 2) corrective action, and/or 3) notice to the user.

The term "SELV design" refers to the product layout and components necessary to achieve SELV.

The term "application" means the operating conditions under which the SELV design maintains SELV, i.e. the design limitations to operate at SELV parameters. "Extraordinary conditions" are those conditions exceeding the application.

The invention provides a system to monitor the SELV power supply of the product and detect operating conditions exceeding application limits and subsequently warn the user or take corrective action. Examples of actions enabled by the present invention, depending on the application environment and Failure Mode and Effect Analysis (FMEA) of the system, may include but are not limited to: Issue a warning to allow operator decision about corrective action; Provide data to a SCADA system to cause a coordinated shutdown; Shut down load or follow a programmed sequence; Enter a degraded mode of operation e.g., to operate without overheating power supply components; or Activate an isolation mechanism to maintain SELV levels of isolation, e.g., open a relay or contactor.

The general environment of the invention is in and around any electronic product that includes a safety extra low voltage circuit. The invention might also be applied to a product with other levels of extra low voltage circuit protection such as protected extra low voltage (PELV) or functional extra low voltage (FELV).

BRIEF DESCRIPTION OF THE DRAWINGS

The foregoing and other advantages of the disclosed embodiments will become apparent upon reading the following detailed description and upon reference to the drawings, wherein.

DETAILED DESCRIPTION

As an initial matter, it will be appreciated that the development of an actual commercial application incorporating aspects of the disclosed embodiments will require many implementation specific decisions to achieve the developer's ultimate goal for the commercial embodiment. Such implementation specific decisions may include, and likely are not limited to, compliance with system related, business related, government related and other constraints, which may vary by specific implementation, location and from time to time. While a developer's efforts might be complex and time consuming in an absolute sense, such efforts would nevertheless be a routine undertaking for those of skill in this art having the benefit of this disclosure.

It should also be understood that the embodiments disclosed and taught herein are susceptible to numerous and various modifications and alternative forms. Thus, the use of a singular term, such as, but not limited to, "a" and the like, is not intended as limiting of the number of items. Similarly, any relational terms, such as, but not limited to, "top," "bottom," "left," "right," "upper," "lower," "down," "up," "side," and the like, used in the written description are for clarity in specific reference to the drawings and are not intended to limit the scope of the invention.

Figure 1:
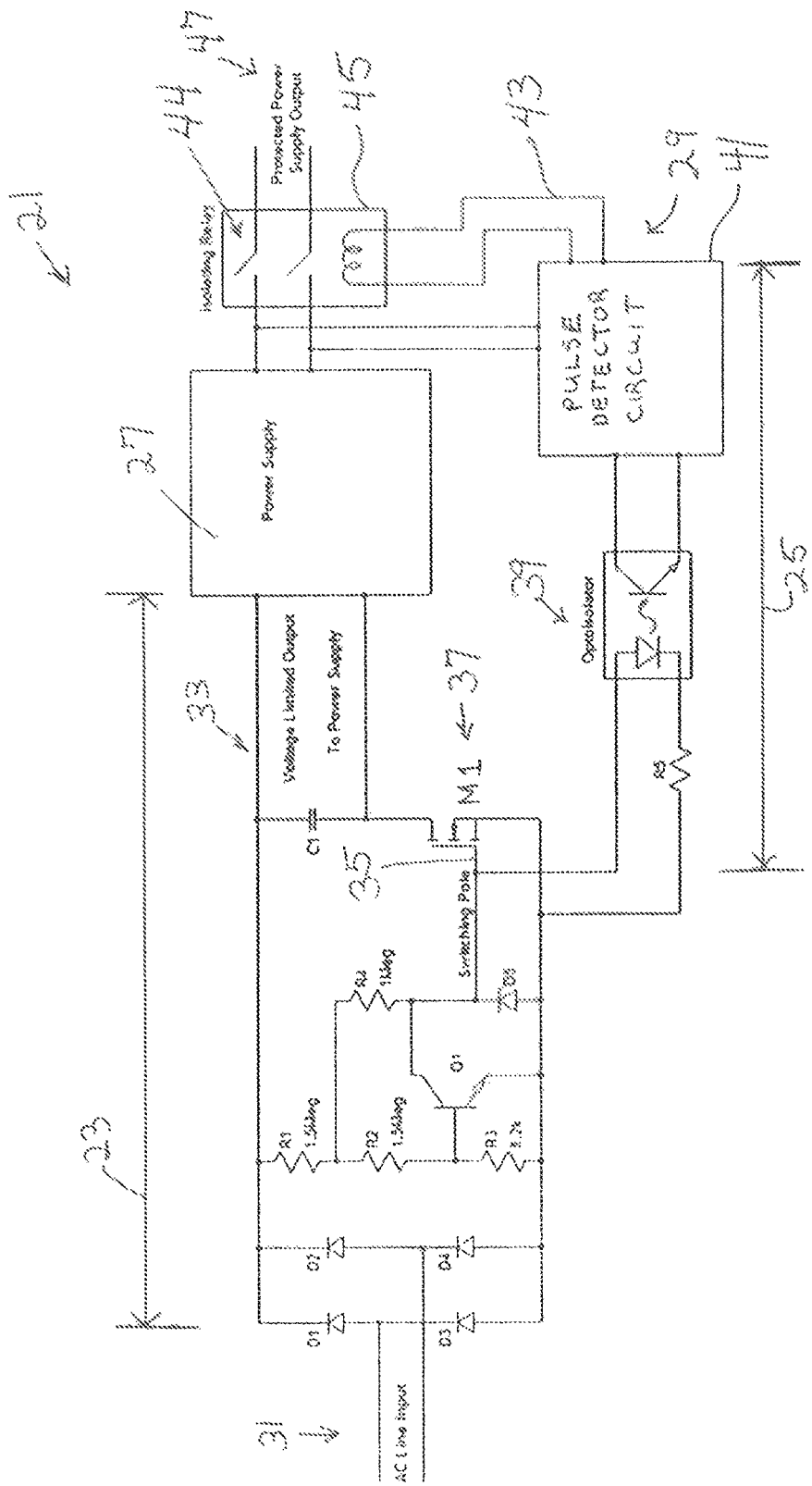
FIG. 1 is a schematic of an exemplary power supply of the present invention.

Further, words of degree, such as "about," "substantially," and the like may be used herein in the sense of "at, or nearly at, when given the manufacturing, design, and material tolerances inherent in the stated circumstances" and are used to prevent the unscrupulous infringer from unfairly taking advantage of the invention disclosure where exact or abso- FIG. 1 shows stages of a power supply 21 illustrating aspects of the present invention having a) a rectifier and voltage limiter stage 23; b) an isolation and detector stage 25, c) a dc power supply 27, and d) a notice and action stage 29. The circuit portion representing the rectifier/voltage limiter stage 23, from the AC line Input 31 through the rectifier and voltage limiter stage 23 is typical for providing a voltage limited output 33 to the DC power supply 27 for powering electronics and need not be discussed in detail. In this circuit, there is a switching pole 35 at the gate of the MOSFET M1. It will be recognized by those of ordinary skill in the art that the MOSFET M1 acts in the typical manner as a switch for this stage providing a voltage-limited input for the DC Power Supply 27. When the power supply 21 is used in an SELV application where the incoming AC voltage 31 exceeds the design SELV application limitations, M1 is commutated off to block conduction by the circuit of R1, R2, R3, Q1 and R4. The Voltage-Limited output 33 to the DC power supply 27 is taken across the storage capacitor C1.

The power supply 21 additionally includes the DC Power Supply circuitry 27 for DC powered, typically digital, components, and the isolation and detector stage 25 circuit which includes an isolator such as the optoisolator 39 (also known as an optocoupler or Op1) and a biasing resistor R5 across the switching pole M1 and the anode of Zener diode D5 at the switching pole 35 of M1. This circuit (R5/Op1) provides a data signal to a pulse detector circuit 41, typically an IC (Integrated Circuit)/controller which monitors and times the commutation of the switching pole M1, and enables output signals, as further explained below.

The pulse detector circuit 41, for example a microcontroller or microprocessor, powered from the DC power supply 27 and/or C1, detects the presence of conditions that violate the SELV design limitations by monitoring the commutation characteristics of the switching pole 35 as provided through the optoisolator 39. For example, when the switching pole M1 is commutated off more than once in a 20 millisecond (ms) period, the phase detector circuit 41 will conclude it has detected extraordinary conditions exceeding the SELV design limits. This 20 ms threshold is applicable for single- and multi-phase 50/60 Hz systems, and will detect one or multiple phases exceeding the SELV design limitations.

Upon detection of the extraordinary conditions, the pulse detector circuit 41 can take one or more actions, such as activate the notice function to warn the product operator and/or activate corrective functions for the product having the SELV isolating power supply or a system containing the product. For example, active corrective functions in the event of loss of SELV function may be for the product or the system which the product is a part of, under SCADA control to cause a coordinated shutdown such as shutting down a load or following other programmed sequence of operations to enter a degraded mode of operation, e.g. to operate without over-heating power supply components; or activate an isolation mechanism to maintain SELV levels of isolation, e.g. open a relay or contactor. In the illustrated example of FIG. 1, a circuit for the activation of an isolation mechanism may include the pulse detector circuit 41 issuing a signal on line 43 upon detection of the extraordinary conditions to open the contacts 44 of an isolation relay 45 thus interrupting the output 47 of the power supply 21.

Figure 2:
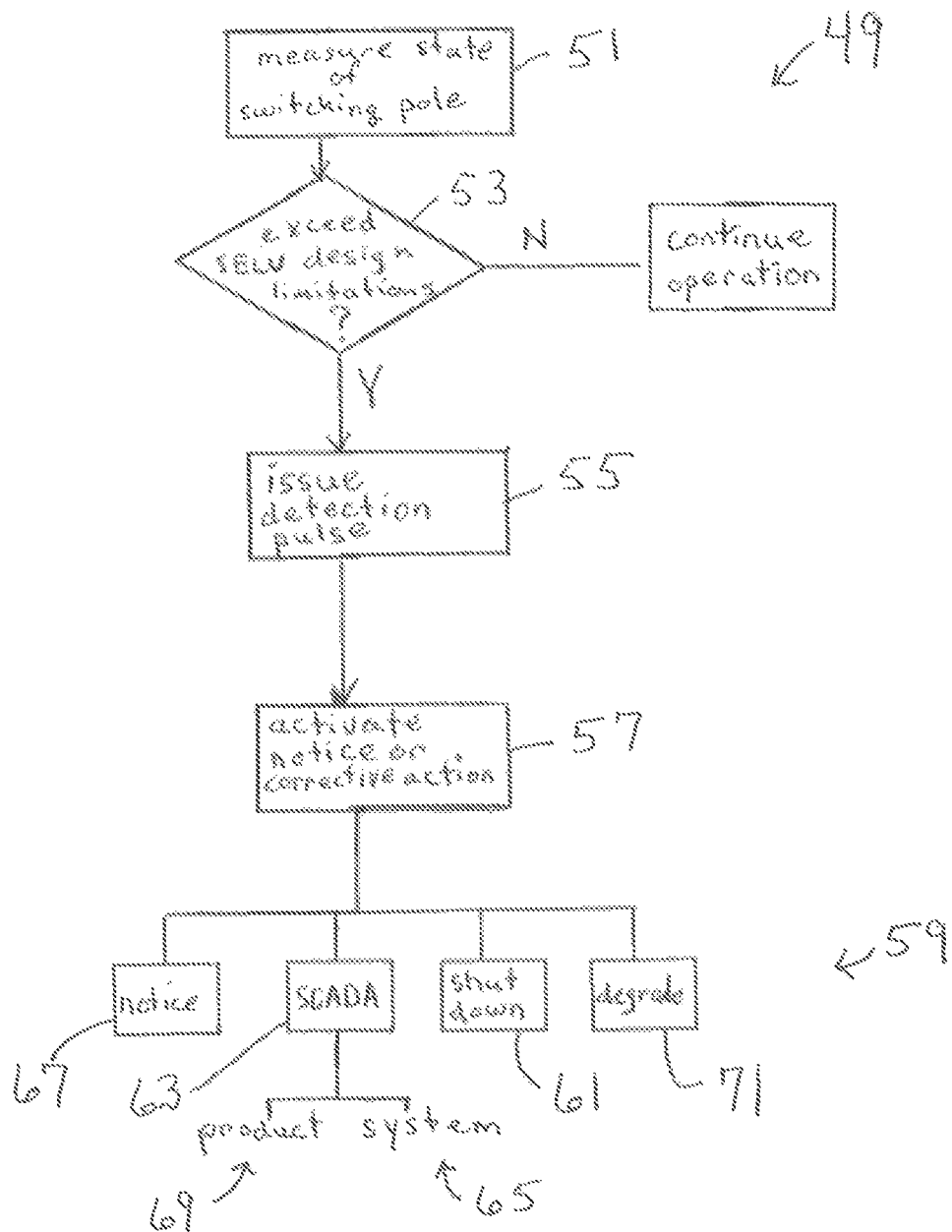
FIG. 2 a block diagram of an algorithm detailing aspects of present invention operation and possible notice and corrective action results.

Referencing FIG. 2, in an another aspect the present invention uses an algorithm 49 to detect and respond to the extraordinary conditions. The algorithm includes the steps of: 1) measuring at step 51 the state of the switching pole as described above; 2) comparing at step 53 the state of the switching pole to the threshold commutation characteristics of desired operation to determine when a voltage is applied to the power supply that exceeds the SELV design limitations; and 3) providing at step 55 a detection pulse output signal to activate at step 57 a notice or a corrective action upon detecting conditions exceeding the design SELV design limitations.

The algorithm has several possible outcomes 59 upon issuing the detection pulse. Examples of possible outcomes include activation of a circuit that disconnects 61 the product power supply from the applied voltage, to maintain the SELV level of performance. Examples of such a circuit may, without limitation, include a relay, a circuit breaker shunt trip mechanism or an electronically controlled circuit breaker. An alternative or additional outcome may be the transmission of a signal or digital message to a SCADA (Supervisory Control And Data Acquisition) system 63, which can initiate coordinated system shutdown 65 to allow mitigation of the extraordinary conditions applied to the product; the transmission of a warning signal 67 to an operator or PLC, such as through a discrete output or digital communications; the initiation of a pre-programmed sequence to de-activate the product 69, to shut down the product or load in a controlled manner; and the initiation of operation in a degraded mode 71. For example, a product may reduce the power provided by certain outputs to avoid excessive temperature rise that could otherwise result from continued operation with the extraordinary condition of applied power supply voltage beyond the SELV design limitations.

While particular aspects, implementations, and applications of the present disclosure have been illustrated and described, it is to be understood that the present disclosure is not limited to the precise construction and compositions disclosed herein and that various modifications, changes, and variations may be apparent from the foregoing descriptions without departing from the invention as defined in the appended claims.

The invention claimed is:

1. A power supply system for extra low voltage circuit protection, comprising:
   a) a rectifier and voltage limiter stage with a switching pole for regulating output power,
   b) an isolation and detector stage with a pulse detector monitoring the switching pole for commutation indicating out of range power inputs at the switching pole and an isolator for isolating the pulse detector from the switching pole;
   c) a DC power supply;
   d) a notice and action stage with an output circuit on the pulse detector for activating a notice or a corrective action upon detection of the pulse detector output, wherein the notice or corrective action comprises at least one of: issuing a notice to a user that the power supply system has been subjected to extraordinary operating conditions; operating a SCADA (Supervisory Control And Data Acquisition) system to mitigate effects of exceeding SELV design limitations; shutting down an output of the power supply; or operating the product in a degraded mode of reduced power.

2. The power supply system of claim 1 wherein the Extra Low Voltage Circuit Protection is for Safety Extra Low Voltage (SELV).

3. The power supply system of claim 1 wherein the switching pole is a FET.

4. The power supply system of claim 3 wherein the FET is a MOSFET.

5. The power supply system of claim 1 wherein the isolator is an optoisolator.

6. The power supply system of claim 1 wherein the further notice or corrective action includes a circuit for issuing a notice to a user that the power supply system has been subjected to extraordinary operating conditions.

7. The power supply system of claim 1 wherein the further notice or action includes a circuit for operating a SCADA (Supervisory Control And Data Acquisition) system to mitigate effects of exceeding SELV design limitations.

8. The power supply system of claim 7 wherein the mitigation includes controlling an operation of a product that contains the power supply system.

9. The power supply system of claim 8 wherein the mitigation includes controlling an operation of a system containing the product that contains the power supply system.

10. The power supply system of claim 1 wherein the further notice or action includes shutting down an output of the power supply.

11. The power supply system of claim 8 wherein the further notice or action includes operating the product in a degraded mode of reduced power.

12. A method of operating a power supply for a Safety Extra Low Voltage (SELV) electronic product, comprising the steps of:

a) monitoring a state of a switching pole within a power supply of the SELV electronic product to determine when a voltage is applied to the power supply that exceeds SELV design limitations of the SELV electronic product; and b) providing a detection output signal to activate a notice or a corrective action during further operation of the SELV electronic product upon detecting conditions indicating that SELV design limitations were exceeded, wherein the notice or corrective action comprises at least one of: issuing a notice to a user that the power supply system has been subjected to extraordinary operating conditions; operating a SCADA (Supervisory Control And Data Acquisition) system to mitigate effects of exceeding SELV design limitations; shutting down an output of the power supply; or operating the product in a degraded mode of reduced power.

13. The method according to claim 12 wherein the state of the switching pole is monitored by an IC (Integrated Circuit) through an optocoupler.

* * * * *